United States Patent [19]
Yamamoto

[11] Patent Number: 5,992,593
[45] Date of Patent: Nov. 30, 1999

[54] FLYWHEEL ASSEMBLY

[75] Inventor: Kozo Yamamoto, Neyagawa, Japan

[73] Assignee: Exedy Corporation, Neyagawa, Japan

[21] Appl. No.: 09/069,862

[22] Filed: Apr. 30, 1998

[30] Foreign Application Priority Data

| May 9, 1997 | [JP] | Japan | 9-119043 |
| May 9, 1997 | [JP] | Japan | 9-119044 |
| May 9, 1997 | [JP] | Japan | 9-119045 |

[51] Int. Cl.⁶ ............... F16F 15/30; F16D 21/00
[52] U.S. Cl. ............ 192/48.1; 74/574; 192/55.1; 192/70.17; 464/68
[58] Field of Search ............... 192/48.1, 70.17, 192/201, 214, 214.1, 55.1, 30 V; 464/66, 68; 74/574

[56] References Cited

U.S. PATENT DOCUMENTS

| 4,790,419 | 12/1988 | Loizeau | 74/574 X |
| 4,796,740 | 1/1989 | Fukushima | 74/574 X |
| 4,846,328 | 7/1989 | Fukushima | 192/214.1 |
| 5,030,166 | 7/1991 | Worner et al. | 74/574 X |
| 5,499,703 | 3/1996 | Kii et al. | 74/574 X |
| 5,645,151 | 7/1997 | Lindner et al. | 192/70.17 |
| 5,816,924 | 10/1998 | Kajitani et al. | 192/201 X |
| 5,823,880 | 10/1998 | Kajitani et al. | 192/201 X |

*Primary Examiner*—Rodney H. Bonck
*Attorney, Agent, or Firm*—Shinjyu An Intellectual Property Firm

[57] ABSTRACT

A flywheel assembly (1) is provided for transmitting torque from a crankshaft (2) to a main drive shaft (3), and includes a first flywheel (4), a second flywheel (5) and a damper mechanism (6). The damper mechanism (6) is mechanically couples the second flywheel and the first flywheel together, however, the second flywheel is physically disposed between the first flywheel and the damper mechanism such that the damper mechanism may be replaced without removal of the second flywheel from the first flywheel.

6 Claims, 6 Drawing Sheets

FLYWHEEL ASSEMBLY

BACKGROUND OF THE INVENTION

A. Field of the Invention

The present invention relates to a flywheel assembly, and particularly a flywheel assembly provided with a damper mechanism between first and second flywheels.

B. Description of the Background Art

A flywheel is attached to a rear end of a crank shaft of an engine for dampening nonuniform crank shaft rotation during low-speed driving. The flywheel carries a ring gear for a starter and also includes means to support a clutch mechanism.

Such a flywheel assembly has been known where a flywheel is divided into first and second flywheels, and a damper mechanism is arranged between them. The damper mechanism includes elastic members which are arranged between the first and second flywheels, and are circumferentially compressed when the first and second flywheels rotate relative to each other. Some types of damper mechanisms include a friction generating mechanism which operates in parallel with the elastic members for dampening vibrations.

In the foregoing flywheel assembly, a power transmitting system can be divided into input and output sides with the elastic member of the damper mechanism therebetween. In such a system the moment of inertia of the input side and output side define a resonance frequency whereby, at a corresponding rotation speed of the engine, natural vibration occurs in the flywheel assembly. Ideally, the resonance frequency should be at a speed well below the idling speed of the engine.

In the flywheel assembly, the rotation speed of the engine passes through the resonance frequency, for example, in a speed range lower than 500 rpm when the engine starts or stops. At this time, an excessively large variation in torque may occur such that the damper mechanism may be damaged and undesirable noises and/or vibrations may occur. Under such conditions, an excessively large torque variation produce impact on the damper mechanism that may exceed a limit or stop torque of the damper mechanism.

In order to overcome the above problem, the damper mechanism may be formed a viscous resistance generating mechanism which utilizes a viscosity of fluid to generate a large resistance against an excessively large torque variation. Also, a lock mechanism may be used that locks the first and second flywheels together during at speeds close to the resonance frequency. The lock mechanism would also release the two flywheels from each other in a high-speed ranges.

Generally, the above described damper mechanism is arranged axially between the first and second flywheels. In a repair operation where a worn damper mechanism is replaced by a new damper mechanism, it is necessary to remove the second flywheel. However, removal of the second flywheel complicates the repair operation.

SUMMARY OF THE INVENTION

One object of the invention is to suppress an excessively large torque variation which may be caused by a resonance in a disengaged state of the clutch.

Another object of the invention is to simplify the operation of exchanging a damper mechanism in a flywheel assembly during a repair operation.

In accordance with one aspect of the present invention, a flywheel assembly includes a first flywheel configured for mounting to a crankshaft of an engine. A second flywheel is disposed adjacent to the first flywheel, the second flywheel being configured for relative rotary displacement with respect to the first flywheel. Further, a damper mechanism is mechanically connectable to both the first and second flywheels. The damper mechanism is configured for transmitting the torque between the first and second flywheels and damping a torsional vibration therebetween. The second flywheel is disposed axially between the first flywheel and the damper mechanism for easy removal.

Preferably, the damper mechanism is directly attached to the first and second flywheels limiting relative rotary displacement therebetween.

Preferably, the flywheel assembly further includes a clutch disk assembly configured for selective friction engagement with a portion of the second flywheel in response to movement of a pressure plate supported on the second flywheel.

Alternatively, the flywheel assembly further includes a first clutch operable between the first and second flywheels. The second flywheel is located axially between the first clutch and the first flywheel and the damper mechanism is attached to a radially inner portion of the first clutch such that in response to the first clutch being engaged with the second flywheel, torque from the first flywheel is transmitted through the damper mechanism to the first clutch and through the first clutch to the second flywheel. An intermediate member is disposed axially adjacent to the first clutch. The intermediate member is connected to the second flywheel such that the intermediate member rotates with the second flywheel and may move in axial directions relative to the second flywheel. A second clutch is disposed adjacent to the intermediate member and a clutch cover assembly is attached to the second flywheel. The clutch cover includes a diaphragm spring and a pressure plate. Further, the first clutch, the intermediate member and the second clutch are disposed in order between the second flywheel and the pressure plate.

Preferably, the damper mechanism further includes a friction member operable with the damper mechanism for dampening vibration.

Alternatively, the damper mechanism further includes a viscous fluid damper operable in the damper mechanism for dampening vibration.

Preferably, the first clutch is provided with a first torque transmitting capacity and the second clutch is provided with a second torque transmitting capacity, such that in response to excessive torque variation from the first flywheel above a predetermined level with the first and second clutch in an engaged state, the first clutch slips with respect to the second flywheel and the second clutch remains engaged between the pressure plate and the intermediate plate thus reducing possible damage to the damper mechanism.

Preferably, the intermediate member is formed at a radial outer periphery with engagement portions. The second flywheel supports pivoting members at a radial outer periphery such that in response to rotation of the first and second flywheels above a predetermined RPM, the pivoting members engage the engagement portions urging the intermediate members into further engagement with the first clutch thus increasing the first torque transmitting capacity.

Preferably, the flywheel assembly further includes a bearing supported on an outer peripheral surface of a radially inner portion of the first flywheel. As well, an inner peripheral portion of the second flywheel is supported by the bearing such that the bearing allows relative rotary displacement between the first and second flywheels.

When the first and second clutches are disengaged from each other and disengaged from transmitting torque, the second flywheel is disengaged from both the damper mechanism and the output rotation member. Therefore, a large moment of inertia is not present in an output side of the damper mechanism so that a resonance frequency is unlikely to coincide with a low RPM range.

When the first clutch is engaged between the second flywheel and the intermediate member, it transmits the torque to the second flywheel. When the second clutch is engaged between the intermediate member and the clutch cover assembly, it receives the torque from the second flywheel. As a result, the torque is supplied from the output member to the output rotation member. When a torsional vibration is supplied to the flywheel assembly, a spring in the damper mechanism is circumferentially compressed between the input member and the first coupling portion so that the damper mechanism absorbs and damps the torsional vibration.

The above configuration allows for simple removal and replacement of a damper mechanism without removing the second flywheel from the first flywheel.

Further, in the above described configuration, when the RPM of the crankshaft passes through a resonance frequency during starting or stopping of the engine, an excessively large torque variation is applied to the flywheel assembly. Due to the configuration of the first clutch having a lower torque transmitting capacity, the first clutch will slide thus protecting the damper mechanism from possible damage under such conditions.

The foregoing and other objects, features, aspects and advantages of the present invention will become more apparent from the following detailed description, when taken in conjunction with the accompanying drawings.

DESCRIPTION OF THE PREFERRED EMBODIMENTS

FIRST EMBODIMENT

Figure 1:
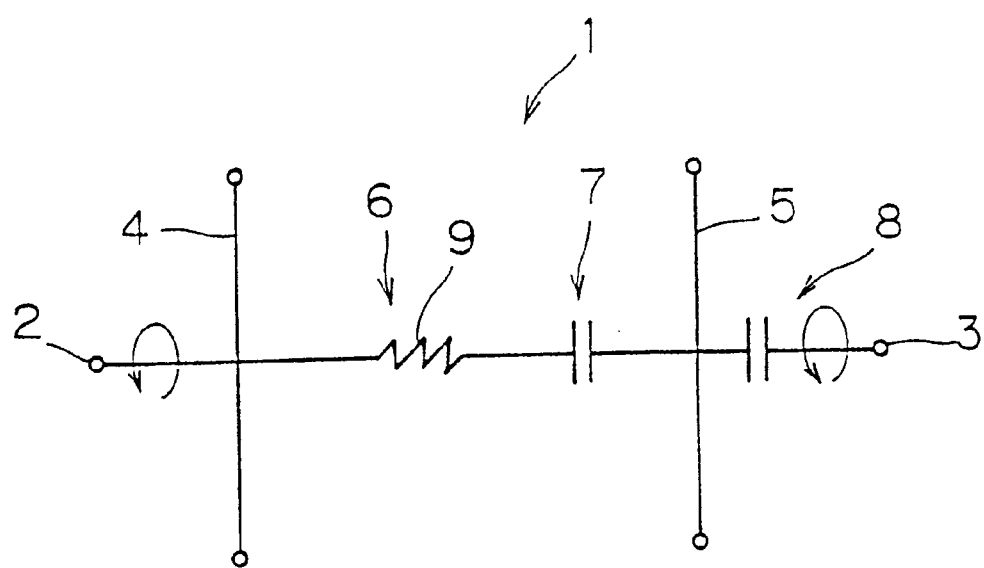
FIG. 1 is a diagram showing a schematic representation of a power transmission system of a flywheel assembly in accordance with a first embodiment of the present invention.
Figure 2:
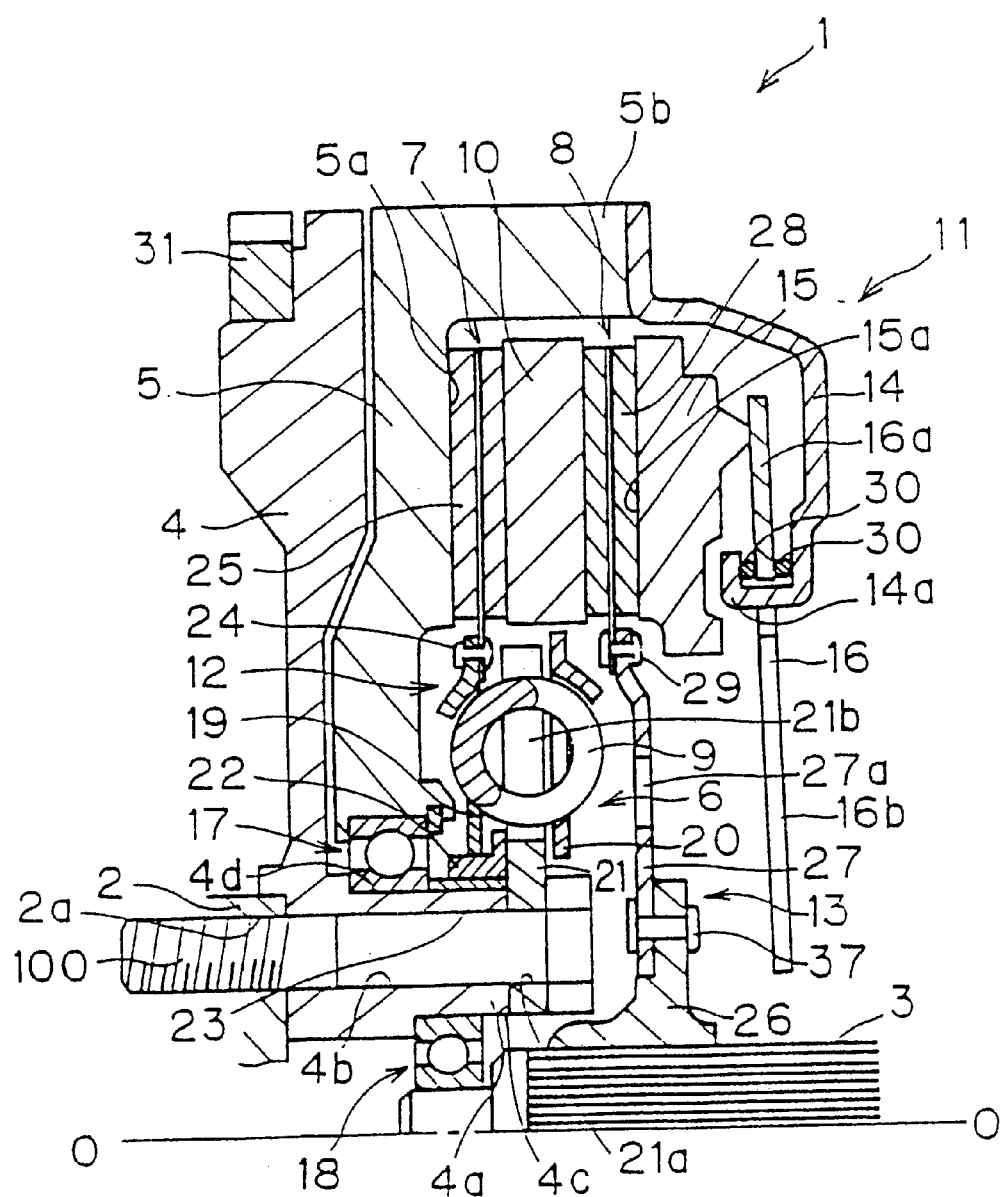
FIG. 2 is a fragmentary cross section showing features of the flywheel assembly of the first embodiment depicted in FIG. 1.

FIG. 1 is a diagram showing a power transmission system of a flywheel assembly 1 of a first embodiment of the present invention, and FIG. 2 is a fragmentary cross section schematically showing the flywheel assembly 1.

In FIG. 1, the flywheel assembly 1 is a power transmission mechanism for transmitting a torque from a crank shaft 2 (input rotation member) of an engine to a main drive shaft 3 (output rotation member) of a transmission, and has a damper function for damping a torsional vibration and a clutch function for transmitting/interrupting the torque. The flywheel assembly 1 is basically formed of a first flywheel 4, a second flywheel 5 and a damper mechanism 6 arranged between the flywheels 4 and 5.

The damper mechanism 6 includes springs 9 which function as elastic members for allowing a relative rotation between the first and second flywheels 4 and 5 within a predetermined angular displacement range. The flywheel assembly 1 further includes first and second clutches 7 and 8. The first clutch 7 is arranged between the first and second flywheels 4 and 5, and more specifically couples the damper mechanism 6 and the second flywheel 5 together. The second clutch 8 is arranged between the second flywheel 5 and the main drive shaft 3. Although not shown in FIG. 1, the flywheel assembly 1 has a clutch cover assembly 11 (i.e., clutch operating mechanism) for operating the first and second clutches 7 and 8. The clutch cover assembly 11 can operate both the first and second clutches 7 and 8 to interrupt the torque substantially simultaneously with each other. The first and second clutches 7 and 8 may have substantially equal torque capacities, or may be designed to have quite different torque capacities, as is described below.

When the torque is transmitted from the crank shaft 2 to the first flywheel 4, the torque is then transmitted to the second flywheel 5 through the damper mechanism 6 and the first clutch mechanism 7. The torque of the second flywheel 5 is supplied to the main drive shaft 3 through the second clutch 8. When the torque is transmitted from the engine, the first and second flywheels 4 and 5 rotate relatively to each other. Thereby, the springs 9 of the damper mechanism 6 are circumferentially compressed to absorb a vibration.

A specific structure, of the flywheel assembly 1 will now be described below with reference to FIG. 2. In FIG. 2, O—O represents a rotation axis of the flywheel assembly 1. In FIG. 2, the left side is an engine side, and the right side is a transmission side.

The flywheel assembly 1 basically includes the first flywheel 4, the second flywheel 5 and the damper mechanism 6. The first flywheel 4 is a plate-like thick member having a circular form. The first flywheel 4 is provided at its radially inner side with a cylindrical portion 4a extending toward the transmission. A plurality of apertures 4b axially extend through the cylindrical portion 4a. These apertures 4b are not provided with thread grooves and therefore, crank bolts 100 extend through the apertures 4b and may be threaded into corresponding holes in the end of the crankshaft. The first flywheel 4 has a large axial thickness at its radially outer portion, and therefore has a large moment of inertia (mass). A ring gear 31 is fixed to the outer periphery of the first flywheel 4. Similarly to the first flywheel 4, the second flywheel 5 is a plate-like thick member having a circular form. The second flywheel 5 is arranged near the first flywheel 4. The second flywheel 5 neighbors to the transmission side of the first flywheel 4 with a slight space therebetween. The second flywheel 5 is provided with a central aperture, through which the cylindrical portion 4a extends toward the transmission. The second flywheel 5 is rotatably carried by the first flywheel 4 through a first bearing 17. The first bearing 17 is interposed between an outer peripheral surface 4d of the cylindrical portion 4a and the inner peripheral surface of the second flywheel 5. The first bearing 17 is formed of an inner race, an outer race and a plurality of rolling elements interposed therebetween. The inner race of the first bearing 17 is fixed to the outer peripheral surface 4d. An end surface of the inner race opposed to the engine is in contact with and carried by the first flywheel 4. The outer race of the first bearing 17 is fixed to the inner peripheral surface of the second flywheel 5 by a snap ring. In this manner, the second flywheel 5 is rotatably carried by the first flywheel 4 through the first bearing 17.

The second flywheel 5 is provided at its radially outer portion with a flat friction surface 5a of an annular form opposed to the transmission. The second flywheel 5 is provided at its radially outer end with a plurality of projections 5b projecting toward the transmission.

A second bearing 18 is arranged radially inside the first flywheel 4 for rotatably carrying the end of the main drive shaft 3. The second bearing 18 is arranged between an inner peripheral surface 4c of the cylindrical portion 4a and the main drive shaft 3. The second bearing 18 is formed of an inner race, an outer race and a plurality of rolling elements interposed between them. The outer race of the second bearing 18 is fixed to the inner peripheral surface 4c of the cylindrical portion 4a. An end surface of the inner race opposed to the engine is in contact with and carried by the first flywheel 4. The inner race of the second bearing 18 is in contact with the end of the main drive shaft 3.

Description will now be given on various members which are arranged on the transmission side with respect to the second flywheel 5, and form the foregoing damper mechanism 6, first clutch 7, second clutch 8 and clutch cover assembly. These members are basically an intermediate member 10, a clutch cover assembly 11, a first clutch disk assembly 12 and a second clutch disk assembly 13. The clutch cover assembly 11 functions as a clutch operating mechanism, and is formed of a clutch cover 14, a pressure plate 15 and a diaphragm spring 16. Clutch cover 14 is an annular member having an outer peripheral portion fixed to the projections 5b of the second flywheel 5, e.g., by bolts (not shown), and extends to a radial position near the inner periphery of the friction surface 5a of the second flywheel 5. The pressure plate 15 is an annular plate member arranged radially inside the clutch cover 14 and thus on the engine side with respect to the clutch cover 14. The pressure plate 15 is fixed to the clutch cover 14 by strap plates (not shown), and is relatively unrotatable and axially movable with respect to the clutch cover 14. The diaphragm spring 16 is arranged between the clutch cover 14 and the pressure plate 15. The diaphragm spring 16 is formed of an annular elastic portion 16a and a plurality of lever portions 16b extending radially inward from the elastic portion 16a. The elastic portion 16a is pivotably carried at its inner periphery by the clutch cover 14 through two wire rings 30. The radially outer portion of the elastic portion 16a is in contact with the surface of the pressure plate 15 opposed to the transmission. The elastic portion 16a is axially compressed between the clutch cover 14 and the pressure plate 15, and applies a biasing force directed toward the friction surface 5a of the second flywheel 5 to the pressure plate 15. A release mechanism (not shown) is arranged at the vicinity of the radially inner ends of the lever portions 16b. When the release mechanism pushes the lever portions 16b toward the engine, the biasing force applied from the diaphragm spring 16 to the pressure plate 15 is released.

The first clutch disk assembly 12 is provided for transmitting the torque from the first flywheel 4 to the second flywheel 5, and includes a damper mechanism 6. The first clutch disk assembly 12 is basically formed of a clutch plate 19, a retaining plate 20, a drive plate 21 and the springs 9. The clutch plate 19 and retaining plate 20 are annular members arranged between the cylindrical portion 4a and the inner periphery of the friction surface 5a. The clutch plate 19 and retaining plate 20 are fixed together by pins (not shown). The annular drive plate 21 is interposed axially between the clutch and retaining plates 19 and 20.

The drive plate 21 is provided at its inner periphery with apertures 21a corresponding to the apertures 4b in the cylindrical portion 4a, respectively. Each crank bolt 100 extends through the aperture 21a in the drive plate 21 and the aperture 4b in the first flywheel 4, and is screwed into a thread aperture 2a formed in the crank shaft 2. The drive plate 21b is provided at its radially outer portion with spring accommodating portions 21b accommodating the springs 9, respectively. Each spring 9 is a coil spring having a spiral form, and is arranged within the spring accommodating portion 21b. The clutch and retaining plates 19 and 20 are provided with cut and bent portions, which restrict radial and axial movement of the springs 9 and support the circumferentially opposite ends of the springs 9. In this manner, the springs 9 transmit the torque from the drive plate 21 to the plates 19 and 20.

The inner periphery of the clutch plate 19 is carried around the outer peripheral surface 4b of the cylindrical portion 4a through bushings 22 and 23 arranged therebetween. The clutch plate 19 carries a first friction facing 25 fixed thereto by a plurality of first rivets 24. The first friction facing 25 is formed of a core plate and facing materials fixed to the opposite sides of the core plate. The first friction facing 25 is close to the friction surface 5a of the second flywheel 5. The first clutch disk assembly 12 described above is arranged on the transmission side with respect to the second flywheel 5. In other words, the damper mechanism 6 is not arranged axially between the first and second flywheels 4 and 5, but rather the second flywheel 5 is disposed between the first flywheel 4 and the damper mechanism 6. This arrangement of the damper mechanism 6 facilitates a simplified exchange of the damper mechanism 6 during repair operations, as is described below. Further, the above arrangement improves the cooling performance for the damper mechanism 6.

The intermediate member 10 is a relatively thick annular member. The intermediate member 10 is arranged on the transmission side with respect to the first friction facing 25. The axially opposite end surfaces of the intermediate member 10 form flat frictional engagement surfaces, respectively. The intermediate member 10 is provided at its outer peripheral portion with a plurality of projections (not shown in the cross-section of FIG. 2). These projections are engaged with the projections 5b of the second flywheel 5, and thereby the intermediate member 10 may not rotate relative to the second flywheel but may move in axial directions within a predetermined range with respect to the second flywheel 5.

The second clutch disk assembly 13 is provided for transmitting the torque from the second flywheel 5 to the main drive shaft 3. The second clutch disk assembly 13 is basically formed of a spline hub 26, a plate 27 and a second friction facing 28. The spline hub 26 is formed of an axially extending cylindrical boss and a flange extending radially outward from the boss. The boss is provided at its inner periphery with a spline aperture engaging with spline teeth which are formed at the outer peripheral surface of the main drive shaft. Owing to this engagement, the spline hub 26 is not rotatable relative to the main drive shaft 3 but may move axially with respect to the main drive shaft 3.

The flange of the sptine hub 26 carries an inner peripheral portion of a circular plate 27 fixed thereto by a plurality of third rivets 37. The outer peripheral portion of the plate 27 carries a second friction facing 28 fixed thereto by a plurality of second rivets 29. The second friction facing 28 has the same structure as the first friction facing 25. The second friction facing 28 is interposed between the side surface of the intermediate member 10 opposed to the transmission and a pressing surface 15a of the pressure plate 15. The plate 27 is provided with a plurality of apertures 27a. An air can be supplied through these apertures 27a to the damper mechanism 6 from a space near the transmission.

In the above structure, the first friction facing 25, second flywheel 5 and intermediate member 10 form the first clutch 7. The intermediate member 10, second friction facing 28 and pressure plate 15 form the second clutch 8.

Operation of the first embodiment is described below.

When a clutch pedal (not shown) is not depressed by a driver of a vehicle equipped with the present invention, and thus a normal driving is being performed, the release mechanism does not press against the diaphragm spring 16 and therefore the elastic portion 16a of the diaphragm spring 16 applies a load to the pressure plate 15. In this state, the first friction facing 25 is held between the second flywheel 5 and the intermediate member 10, and the second friction facing 28 is held between the intermediate member 10 and the pressure plate 15. Thus, both the first and second clutches 7 and 8 are in the engaged state. In this state, the torque of the first flywheel 4 is transmitted to the second flywheel 5 through the damper mechanism 6 and the first clutch 7, and is output to the main drive shaft 3 through the second clutch 8.

When a torsional vibration is supplied to the flywheel assembly 1 in the clutch engaged state, the first and second flywheels 4 and 5 rotate relatively to each other with the damper mechanism 6 therebetween. In this operation, the springs 9 are circumferentially compressed to absorb and dampen the vibration.

When the driver depresses the clutch pedal, the release mechanism (not shown) pushes the ends of the lever portions 16b of the diaphragm spring 16 toward the engine. Thereby, a load applied from the elastic portion 16a to the pressure plate 15 is released so that the pressure plate 15 moves toward the transmission. As a result, the first and second clutches 7 and 8 are disengaged. In this state, the second flywheel 5 is disengaged from both the first flywheel 4 and the second clutch assembly 13.

Measure (1) Against Passage Through a Resonance Point in a Low Speed Range

The driver depresses the clutch pedal when starting the engine. Thereby, both the first and second clutches 7 and 8 are simultaneously disengaged as already described. The second flywheel 5 is released from both the engine side and the transmission side. Since the inertia of moment of the output side of the damper mechanism 6 is small in this state, it is possible to suppress the resonance which may occur in a speed range lower than the idling speed.

Measure (2) Against Passage Through a Resonance Point in a Low Speed Range

Further, the first clutch 7 is designed to have a torque capacity smaller than that of the second clutch 8 so that the first clutch 7 may function as a torque limiter. For this purpose, the first friction facing 25 is designed to have a smaller friction coefficient than the second friction facing 28. In this case, it is possible to damp an excessively large torque variation in a low speed range even when the clutch is engaged.

The second clutch 8 has a torque capacity substantially equal to that of a conventional clutch. The torque capacity of the first clutch 7 is smaller than the stop torque of the damper mechanism 6. Thereby, the torsional vibration can be damped by slippage of the first clutch 7 when an excessively large torque variation exceeding the stop torque is applied to the flywheel assembly 1. Since the first clutch 7 can slip under such conditions, the damper mechanism 6 does not experience the full force of the torque applied and will not undergo displacement to a maximum allowable torsion angle of displacement. Thus, the damper mechanism does not experience a large load and the useful life of the damper mechanism can be extended.

Operation of Exchanging the Damper

When the damper mechanism 6, i.e., first clutch disk assembly 12 is to be exchanged, the clutch cover assembly 11 is first removed from the second flywheel 15. Then, the second clutch disk assembly 13 and the intermediate member 10 are removed. By removing the crank bolts 100, the remaining parts of the flywheel assembly 1 can be removed from the crank shaft 2, and the first clutch disk assembly 6 can be removed from the flywheels 4 and 5. As described above, the damper mechanism 6 can be exchanged easily owing to the structure that the damper mechanism 6 is arranged on the transmission side with respect to the second flywheel 5. Since coupling between the damper mechanism 6 and the second flywheel 5 is performed in a frictional manner through the first friction facing 25, the damper mechanism 6 can be removed easily.

According to the flywheel assembly of the invention, the first clutch is arranged between the first and second flywheels so that the second flywheel is disengaged from both the damper mechanism and the output rotation member when the clutch operating mechanism releases the first and second clutches. Consequently, the output side of the damper mechanism does not have a large moment of inertia and therefore a resonance can be suppressed in a low speed range.

SECOND EMBODIMENT

Figure 3:
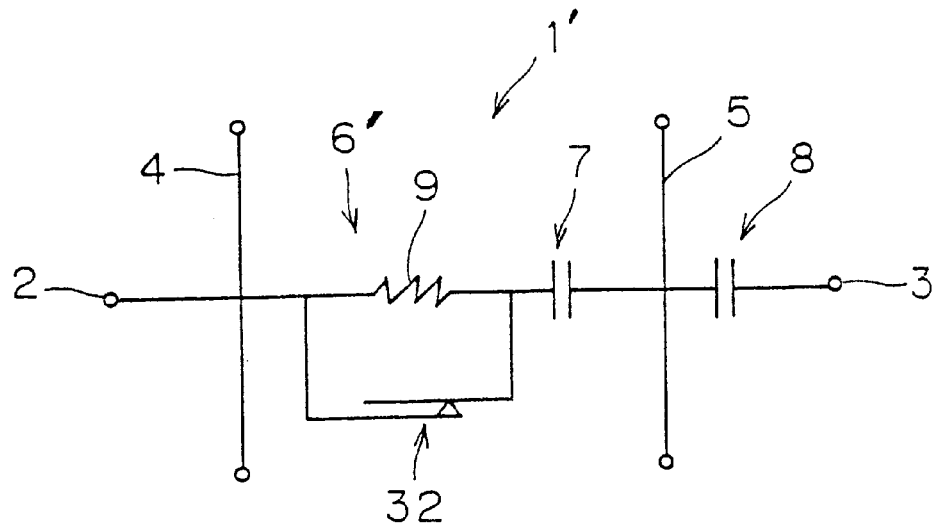
FIG. 3 is a diagram showing a schematic representation of a power transmission system of a flywheel assembly in accordance with a second embodiment of the present invention.

As shown in a diagram of FIG. 3, the damper mechanism 6' may be provided with a frictional resistance generating mechanism 32 which operates in parallel with the springs 9. The flywheel assembly 1' depicted in FIG. 3 is generally the same as the flywheel assembly 1 depicted in FIG. 2 except that the damper mechanism 6' includes the friction resistance generating mechanism 32.

The frictional resistance generating mechanism 32 is formed of washers or the like interposed between the plate 19 (or 20) and the drive plate 21. During dampening of vibrations when the springs 9 are compressed, the rotation of the relatively rotatable portions of the damper mechanism 6' causes the washers to create friction against either the plate 19, the plate 20 and the plate 21 thus providing enhanced dampening characteristics.

THIRD EMBODIMENT

Figure 4:
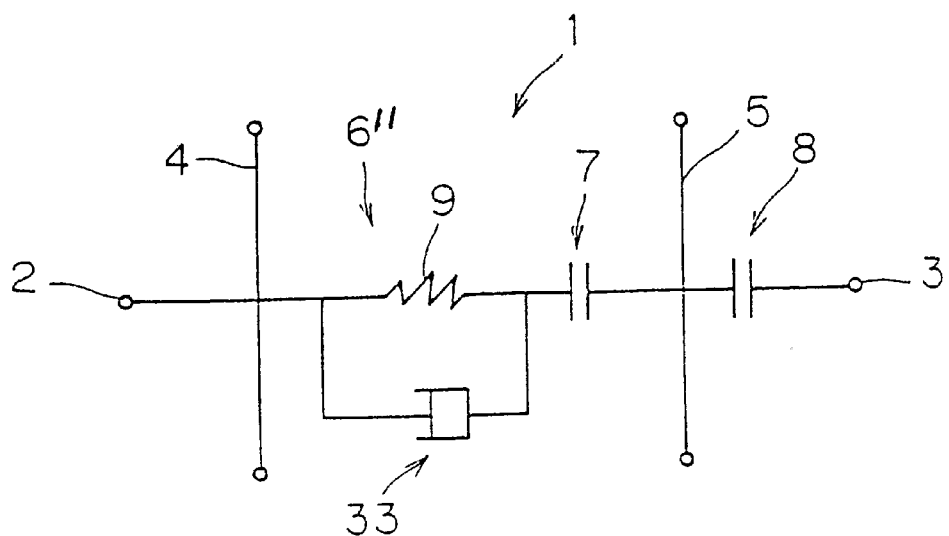
FIG. 4 is a diagram showing a schematic representation of a power transmission system of a flywheel assembly in accordance with a third embodiment of the present invention.

As shown in a diagram of FIG. 4, the damper mechanism 6" may be provided with a viscous resistance generating mechanism 33 which operates in parallel with the springs 9.

This embodiment requires a more complicated structure but can generate a large dampening resistance.

FOURTH EMBODIMENT

Figure 5:
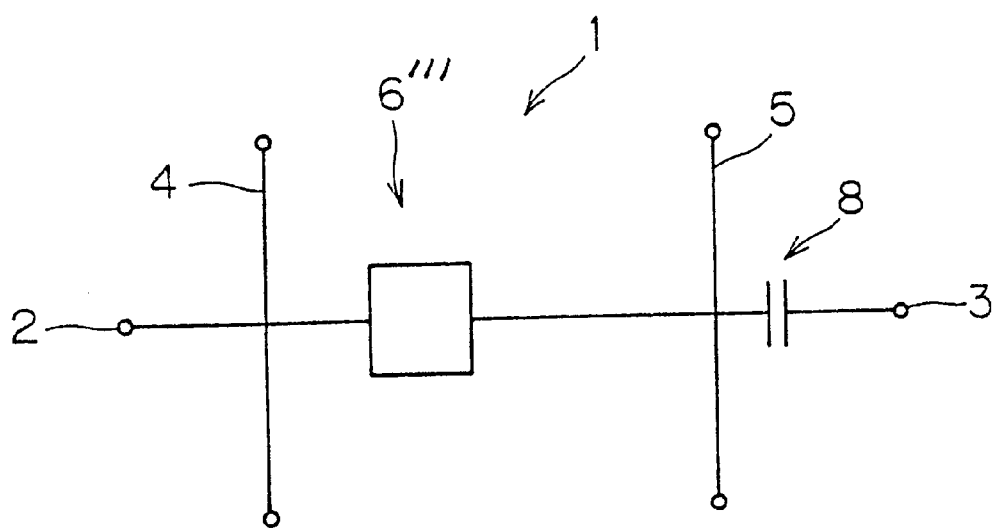
FIG. 5 is a diagram showing a schematic representation of a power transmission system of a flywheel assembly in accordance with a fourth embodiment of the present invention.
Figure 6:
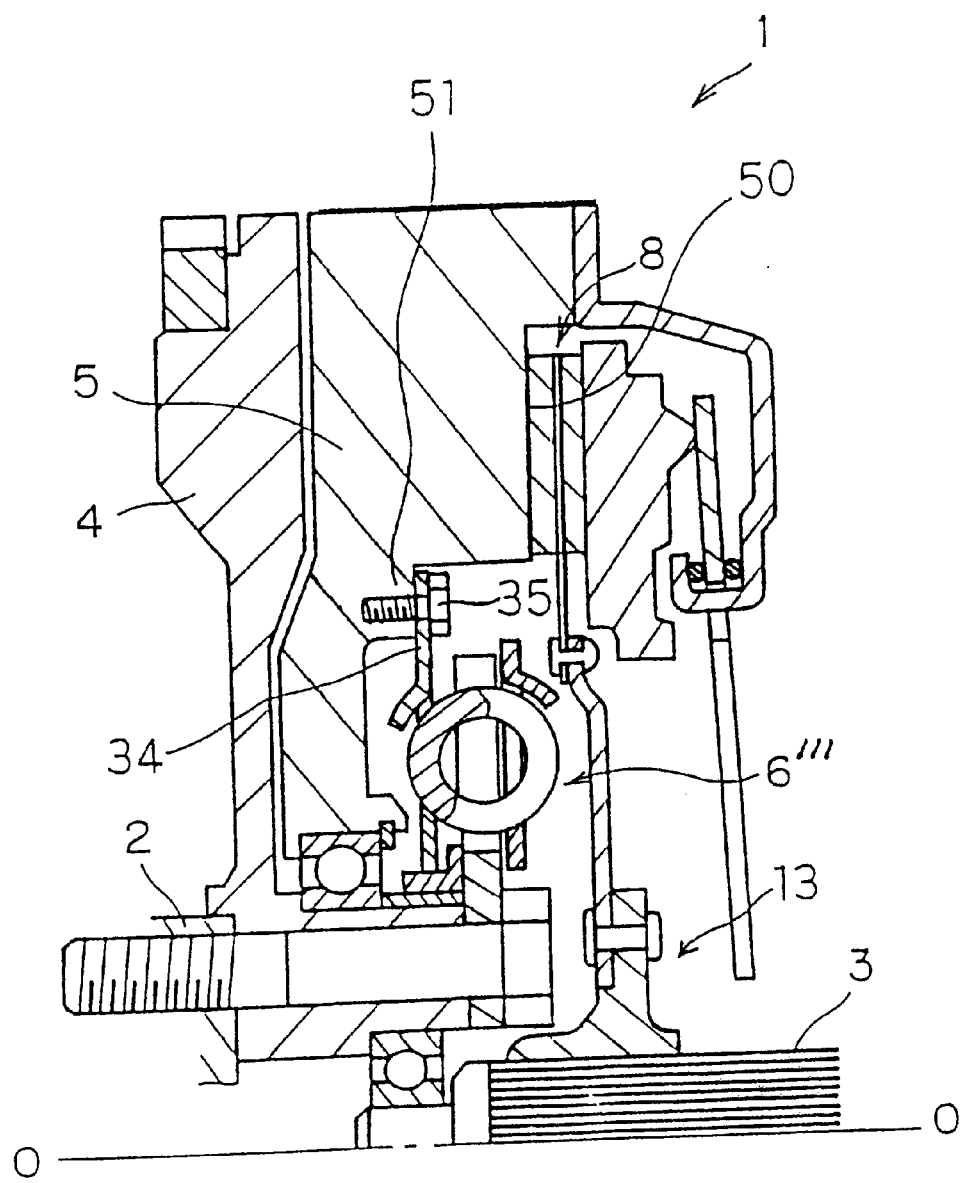
FIG. 6 is a fragmentary cross section showing features of the flywheel assembly in accordance with the fourth embodiment of the present invention, depicted in FIG. 5.

A flywheel assembly 1 shown in FIGS. 5 and 6 differs from that of the first embodiment in that the first clutch 7 is eliminated. Thus, the damper mechanism 6''' and the second flywheel 5 are directly coupled together.

With reference to FIG. 6 showing a specific structure, the foregoing intermediate member is eliminated, and the second flywheel 5 is provided with an annular friction surface 50 neighboring to the clutch 8. A fixing portion 51 provided with a plurality of thread apertures are formed radially inside the friction surface 50. The fixing portion 51 is recessed toward the engine with respect to the friction surface 50.

A clutch plate 34 is provided at its outer peripheral portion with apertures which correspond to the thread apertures, respectively, but are not threaded. Bolts 35 extend through the apertures in the clutch plate 34, and are screwed into the thread apertures in the fixing portion 51. Thus, the clutch plate 34 is fixed to the second flywheel 5 by the bolts 35. The bolts 35 are attached from the transmission side, and therefore one can freely attach and remove the bolts 35 to and from the second flywheel 5 when the clutch disk assembly 13 is removed.

In this embodiment, the damper mechanism 6''' is arranged on the transmission side with respect to the second flywheel 5, as is done also in the foregoing embodiments. Thus, the arrangement of the first and second flywheels 4 and 5 as well as the damper mechanism 6''' is the same as that in the first embodiment so that the damper mechanism 6''' can be exchanged easily.

According to the flywheel assembly of the invention, the damper mechanism is arranged not between both the flywheels but on the output rotation member side of the second flywheel. Therefore, the damper mechanism can be exchanged easily. In particular, it is not necessary to remove the second flywheel, which facilitates a simplified exchange operation.

FIFTH EMBODIMENT

Figure 7:
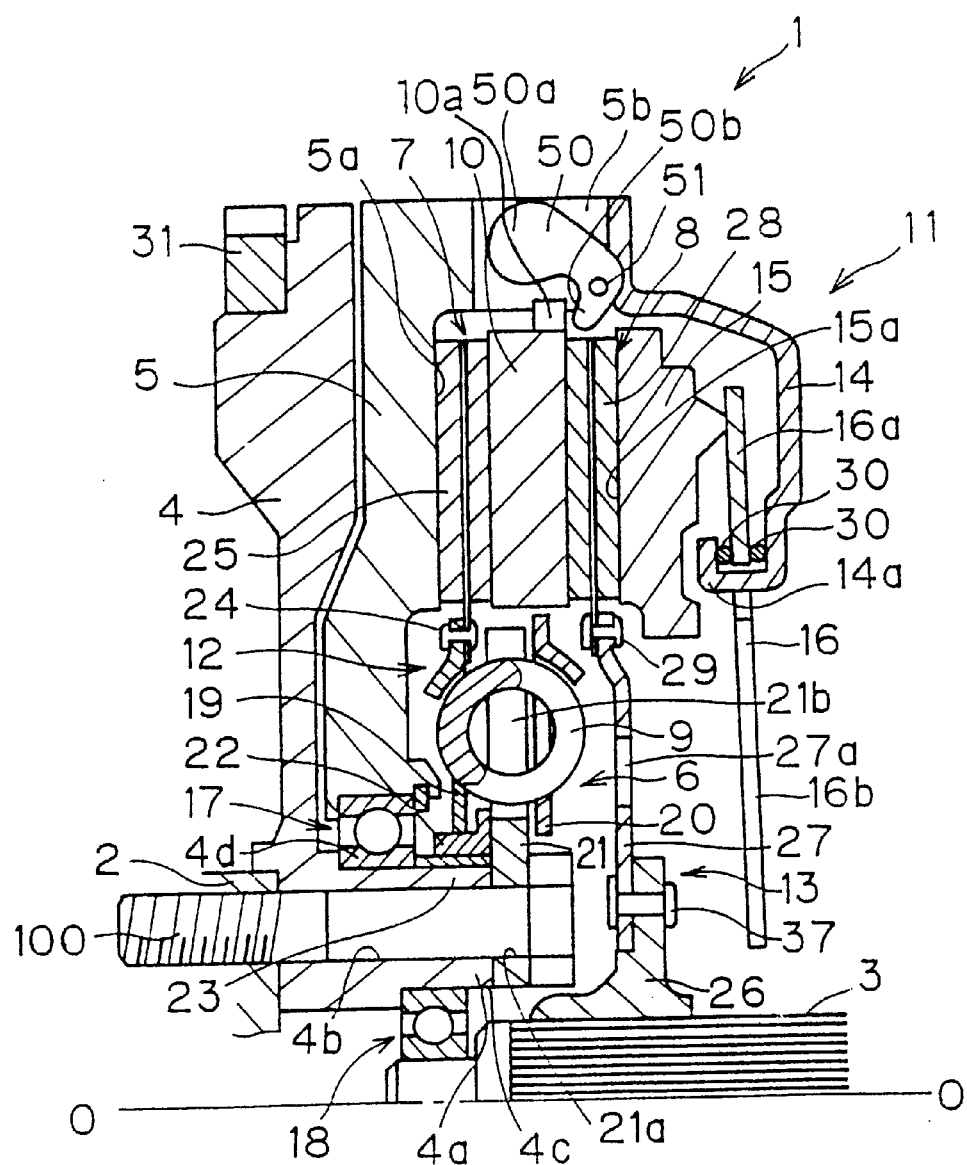
FIG. 7 is a diagram showing a power transmission system of a flywheel assembly in accordance with a fifth embodiment of the invention.

A flywheel assembly 1 shown in FIG. 7 basically has the same structure as that of the first embodiment except that extra features have been added. The following description refers only to those portions which differ from the first embodiment depicted in FIGS. 1 and 2 and described above.

The first flywheel 5 is provided at the projections 5b with a plurality of centrifugal members 50. Each centrifugal member 50 is pivotably supported around a ring 51 functioning as a fulcrum. The ring 51 may be retained radially within the second flywheel 5 by the projections 5b or alternatively, the ring 51 may be attached to the clutch cover. The centrifugal members 50 function as a torque capacity increasing mechanism which increases the torque capacity of the first clutch 7 when the rotation speed of the crank shaft 2 (input rotation member) exceeds a predetermined value. Owing to provision of the torque capacity increasing mechanism, the torque capacity of the first clutch 7 can be set to a low value during a low speed rotation. This can reduce a load which is imposed on the first clutch 7 and the damper mechanism 6 when an excessively large torque variation is applied.

Each centrifugal member 50 is pivotably engaged with the ring 51. The centrifugal member 50 has, as shown in FIG. 5, a mass portion 50a and a pushing portion 50b. The structure and arrangement of the centrifugal member 50 satisfy the following function. When a centrifugal force acts on the centrifugal member 50, the mass portion 50a tends to move radially outward and thereby turns clockwise in FIG. 5 around the ring 51. Thereby, the pushing portion 50b rotates clockwise in FIG. 5.

The intermediate member 10 is provided at its radially outer portion with a plurality of projections 10a corresponding to the centrifugal members 50, respectively. The projections 10a are arranged near the pushing portions 50b of the centrifugal members 50. When the centrifugal member 50 rotates clockwise in FIG. 1 as already described, the pushing portion 50b pushes the projection 10a of the intermediate member 10 toward the friction surface 5a of the second flywheel 5.

According to this flywheel assembly 1, when the rotation speed of crank shaft 2 exceeds the predetermined value, the pushing portions 50b of the centrifugal members 50 push the intermediate member 10 against the second flywheel 5. This increases the torque capacity of the second clutch 7.

In this flywheel assembly 1, the initial torque capacity of the first clutch 7 can be set to a low value. Even if the torque capacity of the first clutch 7 is set to a low value, the centrifugal members 50 can increase the torque capacity of the first clutch 7 during driving of a vehicle.

By setting the initial torque capacity of the first clutch 7 to a small value, it is possible to reduce a load which is imposed on the first clutch 7 and the damper mechanism 6 when an excessively large torque is applied at the time of passage through the resonance point during starting or stopping of the engine.

During high-speed driving, the first clutch 7 biased by the centrifugal members 50 has a low disengaging property. However, the second clutch 8 keeps an intended clutch disengaging property.

The second clutch 8 has a torque capacity similar to that of a conventional clutch.

The torque capacity of the first clutch 7 in the state that the centrifugal members 50 do not act thereon is preferably smaller than the stop torque (maximum torque) of the damper mechanism 6. In this case, the damper mechanism 6 does not twist to the allowable maximum torsion angle when a sliding occurs in the first clutch 7 due to an excessively large torque variation. As a result, disadvantages such as breakage of the damper mechanism 6 are suppressed.

The torque capacity increasing mechanism may be formed of a structure other than the centrifugal members.

According to the flywheel assembly of the invention, the torque capacity of the first clutch is smaller than the torque capacity of the second clutch. Therefore, the sliding occurs in the first clutch when an excessively large torque variation is applied to the flywheel assembly at the time of passage through the resonance point during starting or stopping of the engine. The frictional sliding resistance produced thereby in the first clutch absorbs and damps the excessively large torque variation.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A flywheel assembly comprising:
    a first flywheel configured for mounting to a crankshaft of an engine;

a second flywheel disposed adjacent to said first flywheel, said second flywheel being configured for relative rotary displacement with respect to said first flywheel;

a damper mechanism being mechanically connectable to both said first and second flywheels, said damper mechanism being configured for transmitting the torque between said first and second flywheels and damping a torsional vibration therebetween, said second flywheel being disposed axially between said first flywheel and said damper mechanism;

a first clutch operable between said first and second flywheels, said second flywheel being located axially between said first clutch and said first flywheel, said damper mechanism being attached to a radially inner portion of said first clutch such that in response to said first clutch being engaged with said second flywheel, torque from said first flywheel is transmitted through said damper mechanism to said first clutch and through said first clutch to said second flywheel;

an intermediate member disposed axially adjacent to said first clutch, said intermediate member being connected to said second flywheel such that said intermediate member rotates with said second flywheel and may move in axial directions relative to said second flywheel;

a second clutch disposed adjacent to said intermediate member; and a clutch cover assembly attached to said second flywheel, said clutch cover including a diaphragm spring and a pressure plate with said first clutch, said intermediate member and said second clutch being disposed in order between said second flywheel and said pressure plate.

2. The flywheel assembly as set forth in claim 1 wherein said damper mechanism further comprises a friction member operable with said damper mechanism for dampening vibration.

3. The flywheel assembly as set forth in claim 1 wherein said damper mechanism further comprises a viscous fluid damper operable in said damper mechanism for dampening vibration.

4. The flywheel assembly as set forth in claim 1, wherein said first clutch is provided with a first torque transmitting capacity and said second clutch is provided with a second torque transmitting capacity, such that in response to excessive torque variation from said first flywheel above a predetermined level with said first and second clutch in an engaged state, said first clutch slips with respect to said second flywheel and said second clutch remains engaged between said pressure plate and said intermediate plate thus reducing possible damage to said damper mechanism.

5. The flywheel assembly as set forth in claim 4 wherein said intermediate member is formed at a radial outer periphery with engagement portions and said second flywheel supports pivoting members at a radial outer periphery such that in response to rotation of said first and second flywheels above a predetermined RPM, said pivoting members engage said engagement portions urging said intermediate members into further engagement with said first clutch thus increasing said first torque transmitting capacity.

6. The flywheel assembly as set forth in claim 1, further comprising:

a bearing supported on an outer peripheral surface of a radially inner portion of said first flywheel, and wherein an inner peripheral portion of said second flywheel is supported by said bearing such that said bearing allows relative rotary displacement between said first and second flywheels.

* * * * *